United States Patent [19]

Gador

[11] Patent Number: 5,009,514

[45] Date of Patent: Apr. 23, 1991

[54] METHOD AND APPARATUS FOR PROTECTION AGAINST HEAT

[76] Inventor: Ardon Gador, POB 570, 55105, Kiryat Ono, Israel

[21] Appl. No.: 270,793

[22] Filed: Nov. 14, 1988

[30] Foreign Application Priority Data

Nov. 26, 1987 [IL] Israel .......................... 84611

[51] Int. Cl.⁵ .................. G01J 05/04; G01K 01/14; G01K 13/02
[52] U.S. Cl. .................. 374/138; 73/204.22; 73/204.23
[58] Field of Search ............ 374/144, 39, 135, 148, 374/43, 35, 135; 73/147, 861.71, 180, 204.21, 182, 204.22, 204.11; 137/134 R

[56] References Cited

U.S. PATENT DOCUMENTS

| | | | |
|---|---|---|---|
| 2,512,278 | 6/1950 | Jones | 73/182 X |
| 2,660,056 | 11/1953 | Schuck et al. | 73/180 X |
| 2,660,883 | 12/1953 | Wyczalek | 374/144 X |
| 2,798,893 | 7/1957 | Winkler | 374/135 X |
| 3,000,213 | 9/1961 | Eves et al. | 244/134 X |
| 3,081,628 | 3/1963 | Salera | 73/204.22 X |
| 3,167,956 | 2/1965 | Grey | 374/35 |
| 3,167,960 | 2/1965 | Miesiak | 374/144 X |
| 3,455,155 | 7/1969 | Greenberg et al. | 73/147 |
| 3,623,368 | 11/1971 | Decker, Jr. | 374/144 X |
| 3,974,691 | 8/1976 | Repetto | 374/35 X |
| 4,047,379 | 9/1977 | Brookes et al. | 374/144 X |
| 4,400,097 | 8/1983 | Koschnitzke et al. | 374/135 X |
| 4,458,137 | 7/1984 | Kirkpatrick | 73/182 X |
| 4,463,601 | 8/1984 | Rask | 73/118.2 |
| 4,605,315 | 8/1986 | Kokoszka et al. | 374/144 |
| 4,718,273 | 1/1988 | McCormack | 73/180 X |

FOREIGN PATENT DOCUMENTS

0616553 7/1978 U.S.S.R. .................. 374/144

*Primary Examiner*—Daniel M. Yasich
*Attorney, Agent, or Firm*—Deborah A. Gador

[57] ABSTRACT

A method for slowing the heat transfer rate to a flow facing part of an object exposed to a high total enthalpy fluid flow flowing in a direction approximately perpendicular to that part, including the step of recessing that part. There is also provided apparatus for protecting a heat sensitive instrument (26) in an object (20) from a high enthalpy fluid flow impinging on the instrument in flow facing relationship, and to which the instrument must be exposed due to the nature of its desired functioning, including an essentially unvented recess (22) defined in or near the tip or the leading edge of the object, the instrument being disposed in the recess.

10 Claims, 1 Drawing Sheet

METHOD AND APPARATUS FOR PROTECTION AGAINST HEAT

FIELD OF THE INVENTION

The present invention relates to protection of an area of an object subjected to high total enthalpy fluid flows in general and, in particular, to an apparatus and method for slowing the heat transfer into the area at which a heat sensitive element is to be mounted.

BACKGROUND OF THE INVENTION

It is often desired to perform tests utilizing instruments of various sorts which have at least a portion or an element thereof disposed in structures subjected to and being in a flow facing relationship with high velocity or high temperature flows, i.e., high total enthalpy flows. This occurs, for example in Magneto-Hydro-Dynamic (MHD) generators, in jet engine or missile probing, in some tests conducted in wind tunnels or in some tests and probings conducted on flying vehicles. Many elements of these instruments are adversely affects by high temperature or by temperature changes, and in order to function properly, these elements should be maintained at a fairly stable, low temperature.

In particular, when an element, such as a sensor of an instrument is disposed adjacent to the leading edge or to the tip of an object submerged in a high total enthalpy flow, its heating rate is very high. However, these are desired positions for many purposes such as turbulence measurements in an incoming flow, unperturbed by the probe, or for sensing flow properties such as temperature and temperature non-uniformities or particle velocities, or for infra-red detection of heat in heat seeking missiles and the like.

Utilizing a blunt and thick leading edge or tip, which lowers the heating rate, sometimes adversely affects the fluid flow and the aerodynamic properties of the probe or of the device or flying vehicle which carries it.

There is known in reconnaisance planes a side or bottom facing, shallow recess wherein a camera is disposed behind a glass window, generally disposed in the fuselage. The interior of these recesses has a very uneven heating rate. The more uneven the heating rate, the less efficient the functioning of the window and the instruments therein.

SUMMARY OF THE INVENTION

It is an object of the present invention to provide means for providing a protected flow-facing area within an object subjected to a high total enthalpy fluid flow, which slows the heating rate of an element in the protected area substantially perpendicular to the direction of fluid flow in a way which does not detract substantially from the aerodynamic properties of the object.

It is a further object to provide a method for protecting any heat sensitive element that should be in fairly direct contact with a high total enthalpy fluid flow flowing approximately perpendicular to the element, by disposing the heat affected element in a protected, recessed area of an object subjected to the high total enthalpy flow.

There is thus provided in accordance with the present invention a method for slowing the heat transfer rate to a flow facing part or element near the leading edge or tip of an object exposed to a high total enthalpy fluid flow, including the step of recessing that part or element within said object. The change in heating rate depends strongly on the ratio of the depth of the recess to its diameter or width at the top of the recess.

There is also provided in accordance with the present invention a method for protecting a heat sensitive instrument or element of an instrument, subjected to a high total enthalpy fluid flow normal to the instrument or element thereof, and located in an object disposed in the flowing, including the step of disposing the instrument or element in a recess near the leading edge or tip of the object.

There is also provided in accordance with the present invention apparatus for protecting a heat sensitive instrument or element in an object from a high enthalpy fluid flow impinging on the instrument or element, and to which it must be exposed due to the nature of its desired functioning, including a recess defined in or near the leading edge or tip of the object, the instrument or element being disposed in the recess.

According to the one embodiment, the recess is cylindrical. According to an alternate embodiment, the recess defines a truncated cone.

BRIEF DESCRIPTION OF THE DRAWINGS

The present invention will be further understood and appreciated from the following detailed description taken in conjunction with the drawings in which.

DETAILED DESCRIPTION OF THE INVENTION

There are many occasions on which a probe, sensor, detector or other instrument, or a protective window or other element associated therewith is disposed near the stagnation zone of an object subjected to a high total enthalpy fluid flow. As used herein, the term leading edge will be used to refer to the leading edge or tip of the object, which includes the stagnation line or point. For a given flow, for example about a wing, the stagnation points along the leading edge form a stagnation line which would move with changes in the angle of attack. Therefore, a stagnation zone would encompass a range of stagnation lines. The instruments or elements include, for example, turbulence probes, pressure, acoustic or heat sensors and, light or IR detectors. While the elements themselves, or their associated protective elements, must be exposed to the flow and located approximately perpendicular to the flow (i.e., facing the flow), they often are adversely affected by high temperatures. Therefore, their useful duration of operation decreases as the rate at which they are heated increases. As used herein, such elements will be called heat sensitive elements.

The method and apparatus of the present invention serve to prolong the useful, functioning life of such instruments by providing an environment wherein the local rate of heating and cooling is slowed down relative to the same location on a similar object without a recess.

Figure 1:
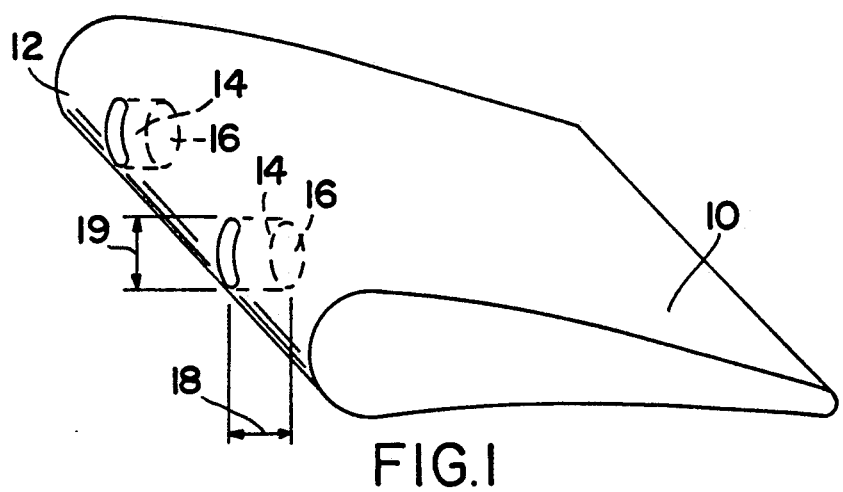
FIG. 1 is a perspective view of an object constructed and operative in accordance with the present invention.

The present invention relates to a method of slowing down the heat transfer rate of a part adjacent to or on the leading edge of an object subjected to a high total enthalpy fluid flow when the flow-facing part comes into direct contact with the flow impinging thereon. The method comprises recessing that part of the object. It will be appreciated by those skilled in the art that the change in the heating rate of a flow-facing recess submerged in a fluid flow depends strongly on the ratio of the depth of the recess to the diameter or width, as illustrated in FIG. 1, measured perpendicular to the stagnation line, and direction of flow at the top of the recess. This lowering of the heating rate is achieved by slowing down the radial velocity flowing parallel to the bottom of the recess.

In addition, the invention relates to a method for protecting a heat sensitive element in an object from a high enthalpy fluid flow impinging normally on the element and to which it must be exposed due to the nature of its desired functioning. The method comprises disposing the element in a recess defined near or on the leading edge of the object. The recess may be cylindrical in shape, it may define a truncated cone, or any other desired configuration.

Referring to FIG. 1 there is shown a general perspective view of an object, here a jet engine vane or blade 10, constructed and operative in accordance with the present invention. Blade 10 includes a leading edge or stagnation line 12 where the fluid flow is substantially stopped.

Defined on or near the leading edge is a recessed area 14 substantially in axial alignment with the direction of fluid flow, i.e., with its opening facing the fluid flow. Recessed area 14 is illustrated in FIG. 1 as being cylindrical in shape. The innermost surface 16 is the area best protected, i.e., the area where the rate of heat transfer is substantially slowed, the sides of the recess adjacent to surface 16 also being protected, but to a lesser degree. The heat transfer rate is largely dependent upon the ratio of the depth 18 of the recess to the diameter 19 of the outermost part of the recess for a recess of circular cross section. For other shapes, the ratio of depth 18 to width (also represented as 19 on FIG. 1) is measured substantially perpendicular both to the direction of flow and to the stagnation line at the outermost part of the recess on the surface on the object.

It will be appreciated that the rate of heat transfer in the object at the outer edges of the recess will be faster than to the corresponding point on an identical object without a recess. One can compensate for this effect by utilizing materials resistant to higher temperatures at those points on the object. Thus, while the invention provides a protected area near the leading edge of the object, it does not improve the heat transfer characteristics all along the leading edge.

Figure 2:
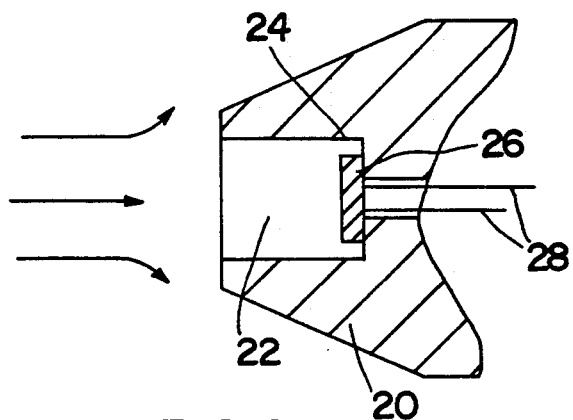
FIG. 2 is a schematic side sectional view of a portion of an object constructed and operative in accordance with an embodiment of the present invention with an heat sensitive element disposed therein.

With reference to FIG. 2, there is shown a detail schematic side sectional view of an object constructed and operative in accordance with one embodiment of the invention with a heat sensitive element disposed therein. The object 20 is subjected to a fluid flow in the direction indicated by the arrows. A recess 22 is defined in object 20. In the base 24 of recess 22 a heat sensitive element 26 is disposed. Heat sensitive element 26 may comprise a turbulence measuring device, such as a strain-gauge, or any other element adversely affected by high temperatures. The electrical leads 28 from heat sensitive element 26 may extend into the object, as known.

It is a particular feature of the present invention that the recess is essentially unvented or closed. Small apertures for electrical wires and so on need not be totally sealed. The requirement is that the recessed area serve, like the leading edge itself, to substantially stop the fluid flow.

Figure 3:
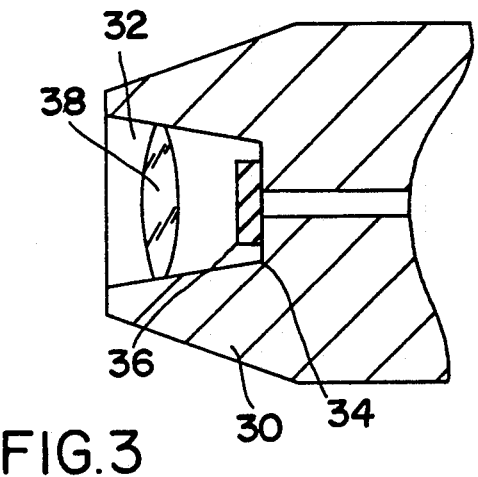
FIG. 3 is a schematic side sectional view of a portion of an object constructed and operative in accordance with an alternate embodiment of the present invention with heat sensitive element disposed therein.

Referring now to FIG. 3, there is shown an alternate embodiment of the present invention comprising an object 30 defining a recess 32. In this embodiment, recess 32 defines a truncated cone, being wider at the outermost portion than at the base 34. This shape is particularly suitable for instruments requiring a wider angle of view than is provided by a cylindrical recess.

Disposed in the base 34 of recess 32 is a photo or IR detecting, heat sensitive element 36. A heat sensitive lens 38 is disposed in recess 32 spaced from element 36, as shown. It will be appreciated that both lens 38 and element 36 are protected in this arrangement, the lens 38 by being disposed in the recess, the element 36 by being protected from direct contact with the flow. The depth of recess 32 and the location of lens 38 are designed according to the heat transfer requirements of the specific use.

Figure 4:
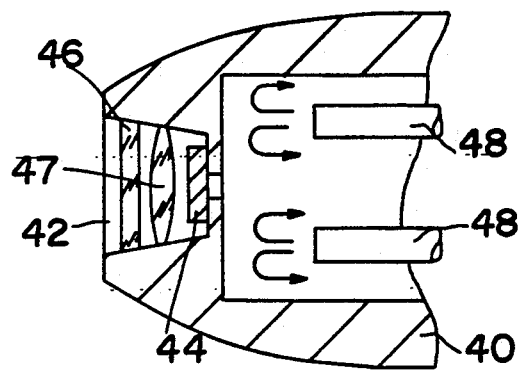
FIG. 4 is a schematic side sectional view of a portion of an object constructed and operative in accordance with another alternate embodiment of the present invention with heat sensitive element disposed therein.

Additional means of protection for the instrument which are known in conventional objects may be utilized in conjunction with the apparatus of the present invention. With reference to FIG. 4, there is shown an object 40 constructed and operative in accordance with the present invention. Object 40 defines a recess 42 wherein an element 44 of any heat sensitive type is disposed. The object 40 of FIG. 4 is further provided with a protective heat sensitive window 46 disposed in recess 42. Protective window 46 may be of any conventional construction and serves to provide additional protection for element 44 against heat or abrasion. A heat sensitive lens 47 may be provided, if required, between the element 44 and protective window 46. The depth of the recess for the aforementioned ratio to diameter or width, in the case of multiple elements as illustrated in FIGS. 3 and 4, is measured to the mounted element 38 or 46 closest to the surface of the object, i.e., where the flow impinges. Thus, the factors considered for determining an appropriate depth are the shape of the recess, the required field of view and the desired reduction of heat transfer rate for a particular heat sensitive element. Alternatively, or in addition, cooling means 48 of any conventional design may be provided. Here, flows of cooling fluid are provided by cooling means 48 to cool the support of the mounted elements 44, 46 and 47 proximate to the leading edge thereby further slowing the rate at which the mounted elements are heated by the fluid flow.

It will be appreciated by those skilled in the art that the invention is not limited to what has been shown and described hereinabove by way of example. Rather, the scope of the invention is limited solely by the claims which follow.

What is claimed is:

1. A method for slowing the convective heat transfer rate from a high total enthalpy fluid flow to an area of an object with a heat sensitive element mounted thereat, facing the fluid flow and located at the stagnation zone of the object, comprising the step of, recessing said heat sensitive element into said object at said stagnation zone to provide a substantially unvented recess facing said fluid flow, the depth of said heat sensitive element in said object having a ratio to the diameter of said recess at the surface of said object for a recess of circular cross section, or to the recess dimension at the surface of said object substantially perpendicular both to the direction of said flow and to the stagnation line of the stagnation zone for a recess of other than a circular cross section, to reduce the radial velocity of flow parallel to the area of said heat sensitive element within said recess, thereby slowing the heat transfer to said heat sensitive element.

2. A method for slowing the convective heat transfer rate from a high total enthalpy fluid flow to a heat sensitive element located at the stagnation zone of an object facing the flow, comprising the steps of, forming a substantially unvented recess in said object facing said flow at said stagnation zone, and mounting said heat sensitive element to be flow facing within said recess substantially perpendicular to the direction of fluid flow, the depth of said heat sensitive element in said recess within said object having a ratio to the recess diameter at the surface of said object for a recess of circular cross section, or to the recess dimension at the surface of said object substantially perpendicular both to the direction of flow and to the stagnation line of the stagnation zone of a recess of other than a circular cross section, which produces a reduction of the radial velocity of flow parallel to the flow facing heat sensitive element, thereby producing a reduction of heat transfer rate at said heat sensitive element.

3. Apparatus for slowing the convective heat transfer rate of a high total enthalpy fluid flow to protect a heat sensitive element exposed to said flow comprising, an object adapted to be oriented substantially in parallelism with the direction of fluid flow and having at least a portion of its surface in a flow facing relationship, causing a stagnation point or line within a stagnation zone at said portion of said surface, a substantially unvented recess in said object at said stagnation zone extending through said surface in a direction substantially in parallelism with the direction of said fluid flow, a heat sensitive element mounted in said recess substantially perpendicular to said flow at a depth such that the ratio of the depth of said heat sensitive element in said recess within said object to the recess diameter at the surface of said object for a recess of circular cross section, or to the recess dimension at the surface of said object substantially perpendicular both to the direction of flow and to the stagnation line of the stagnation zone for a recess of other than a circular cross section, to reduce at said heat sensitive element the radial velocity of flow parallel thereto, thereby slowing the heat transfer rate.

4. An apparatus as defined in claim 3, wherein said recess is cylindrical.

5. An apparatus as defined in claim 3 wherein said recess defines a truncated cone.

6. An apparatus as defined in claim 3 wherein said heat sensitive element is a protective window.

7. An apparatus as defined in claim 6 including at least one other heat sensitive element disposed in said recess inwardly of said protective window.

8. An apparatus as defined in claim 3 wherein said heat sensitive member is a lens.

9. An apparatus as defined in claim 3 wherein said heat sensitive member is a sensor.

10. An apparatus as defined in claim 3 including cooling means disposed in said object for cooling at least a portion of the periphery of said recess.

* * * * *